No. 772,442. PATENTED OCT. 18, 1904.
C. THIBODEAU.
CANDY PULLING MACHINE.
APPLICATION FILED MAR. 28, 1904.
NO MODEL. 2 SHEETS—SHEET 2.
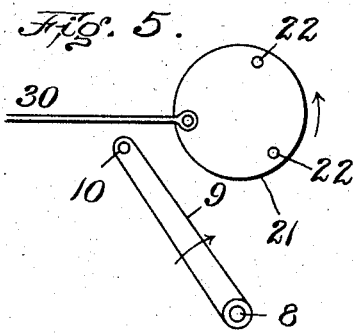
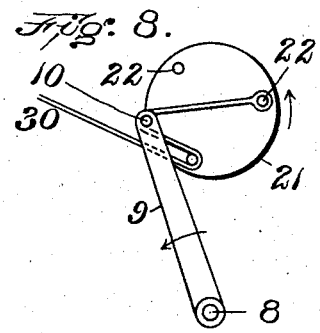
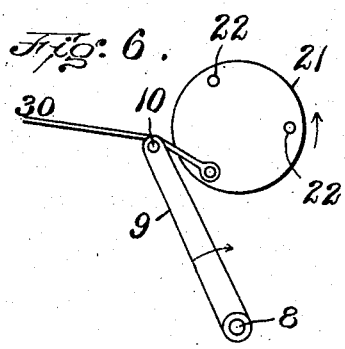
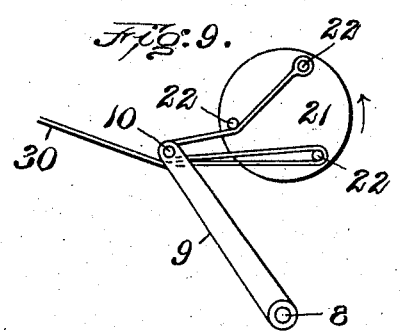
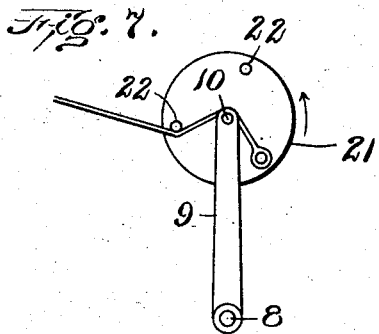
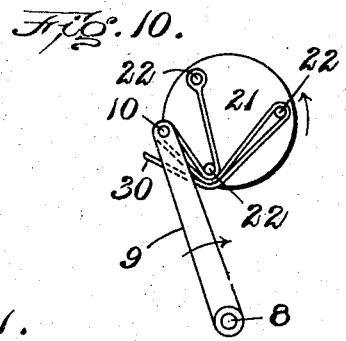
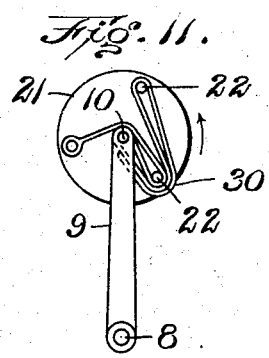
Witnesses:
R. Bullock.
Walter P. Abell.
Inventor:
Charles Thibodeau
By Wright Brown & Quinby
Attys.

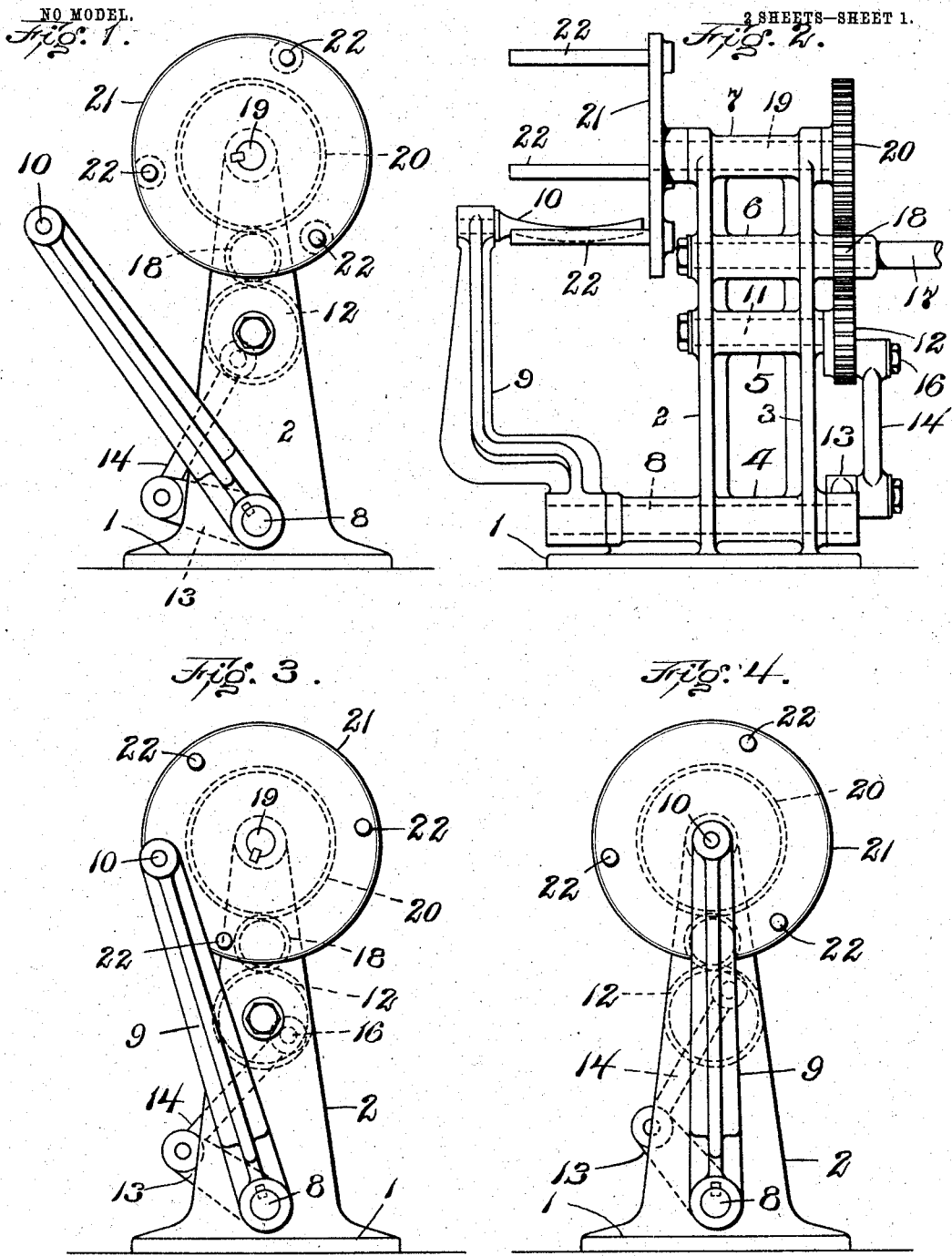

No. 772,442.

Patented October 18, 1904.

UNITED STATES PATENT OFFICE.

CHARLES THIBODEAU, OF SOMERVILLE, MASSACHUSETTS, ASSIGNOR TO P. DUFF & SONS, OF PITTSBURG, PENNSYLVANIA.

CANDY-PULLING MACHINE.

SPECIFICATION forming part of Letters Patent No. 772,442, dated October 18, 1904.

Application filed March 28, 1904. Serial No. 200,334. (No model.)

*To all whom it may concern:*

Be it known that I, CHARLES THIBODEAU, of Somerville, in the county of Middlesex and State of Massachusetts, have invented certain new and useful Improvements in Candy-Pulling Machines, of which the following is a specification.

Figure 1 is a side elevation of a machine made in accordance with my invention. Fig. 2 is a front elevation of said machine. Fig. 3 is a view similar to Fig. 1, showing the parts in a different position. Fig. 4 is a view showing a different position of the parts from that shown in Figs. 1 and 3. Figs. 5 to 11, both inclusive, are diagrammatic views showing the successive relative positions in relation to each other occupied by the oscillating hook and the rotary hooks.

1 represents a suitable base. Upon this base, in the form herein shown and integral therewith, are arranged two parallel uprights 2 3, formed with bearings 4, 5, 6, and 7. In the form of machine herein shown these bearings are integral with the uprights. This feature, however, is not essential, but is convenient for cheapness of construction and strength.

8 represents a shaft arranged in the bearing 4. To one end of this shaft is secured one end of an arm 9.

10 represents a candy puller or pin carried by the free end of the arm 9.

11 represents a short shaft arranged in the bearing 5 and carrying a spur-gear 12 upon its outer end.

13 represents a crank one end of which is fastened upon the inner end of the shaft 8.

14 represents a pitman to one end of which is connected the free end of the crank 13. The opposite end is connected to a pin 16, carried by the gear 12. By this construction as the gear 12 rotates a rocking motion is given to the shaft 8 and a vibrating motion to the pin 10.

17 represents a shaft arranged in the bearing 6, carrying a spur-gear 18. This shaft 17 may be extended, as shown, for the purpose of attaching a pulley, crank, or other means for connecting said shaft 17 with a suitable source of power.

19 represents a shaft arranged in the bearing 7, having secured to its outer end a spur-gear 20, meshing with the spur-gear 18, receiving its motion from the latter.

21 represents a disk secured to the inner end of the shaft 19 and carrying upon its inner face a plurality of candy hooks or pullers 22, here shown as three in number, although this number may be varied. The rotation of the gear 20 causes the rotation of the disk 21, thereby rotating the pins 22. In place of the disk the pins may be carried by arms, the latter, together with their common hub, forming a spider, or in any preferred way.

The operation of my improved machine is as follows: The rotation of the shaft 17 causes the gears 20 and 12 to rotate, thus giving a vibrating motion to the pin 10, heretofore referred to, and a rotary motion to the pins 22. These movements are so timed that the pin 10 passes back and forth across the paths of motions of the pins 22 without striking said pins. Where three pins are employed and the parts are connected together as shown in these drawings, the vibrating pin 10 passes first outside of one pin and inside of the succeeding pin, and so on.

Figs. 5 to 11 show the successive positions assumed by the pins. In Fig. 5 the pin 10 does not engage the candy 30. Such engagement, however, does occur in Fig. 6. In Fig. 7 the candy is forced between the two consecutive pins 22 and the pin 10 has reached its limit of inward movement. In Fig. 8 the pin 10 has started out. In Fig. 9 the pin has reached its limit of outward movement and a new pin 22 has engaged the candy. In Fig. 10 the parts are at substantially the position shown in Fig. 6, except that all of the hooks are in engagement with the candy, and the machine will therefore continuously pull until the mass is properly whitened or tempered. Fig. 11 shows a continuation of the movement after Fig. 10.

A machine constructed in accordance with my invention is highly efficient and simple in construction.

The hooks or pins 22 are shown in the drawings as at the same radial distance from the axis of their revolution; but it is to be understood that such radial distance may vary—that is, one hook or pin 22 may move in the path of a larger circle than another pin 22. The said hooks or pins are, however, mounted to follow each other in the same plane of revolution, so as to engage and operate upon the same batch of candy that is being pulled.

Having thus explained the nature of my invention and described a way of making and using the same, although without attempting to set forth all of the forms in which it may be made or all of the modes of its use, what I claim, and desire to secure by Letters Patent, is—

1. In combination with the coöperative elements of a candy-pulling machine, a plurality of hooks mounted to follow each other in the same plane of revolution, a puller, and means for vibrating the latter across the paths of motion of said hooks.

2. In combination with the coöperative elements of a candy-pulling machine, three revolving pins arranged upon a common axis to follow each other in one plane of revolution, a puller, and means for vibrating said puller across the paths of motion of said pins.

3. In combination with the coöperative elements of a candy-pulling machine, a rotating disk carrying a plurality of candy-hooks, a puller, and means for vibrating the puller across the paths of motion of said revolving hooks.

In testimony whereof I have affixed my signature in presence of two witnesses.

CHARLES THIBODEAU.

Witnesses:
H. L. ROBBINS,
R. BULLOCK.